(12) United States Patent
Kashio et al.

(10) Patent No.: US 6,243,932 B1
(45) Date of Patent: Jun. 12, 2001

(54) MANUFACTURING METHOD OF EXPANDED GRID AND ITS MANUFACTURING APPARATUS

(75) Inventors: Go Kashio; Akira Iwamura, both of Aichi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/141,215

(22) Filed: Aug. 27, 1998

(30) Foreign Application Priority Data

Aug. 28, 1997 (JP) .................................... 9-232074

(51) Int. Cl.[7] .................. B23P 13/00; B21D 31/04; H01M 4/74
(52) U.S. Cl. .............. 29/2; 29/6.1; 29/6.2; 29/623.1; 429/233; 429/242
(58) Field of Search .................... 29/2, 6.1, 6.2, 29/623.1; 429/241, 242, 233

(56) References Cited

U.S. PATENT DOCUMENTS

| | | |
|---|---|---|
| 3,867,200 | 2/1975 | Daniels, Jr. . |
| 4,221,032 | 9/1980 | Cousino et al. . |
| 4,303,747 | 12/1981 | Bender . |

FOREIGN PATENT DOCUMENTS

| | | |
|---|---|---|
| 0 682 378 | 11/1995 | (EP) . |
| 2 200 069 | 7/1988 | (GB) . |

OTHER PUBLICATIONS

European Search Report corresponding to application No. EP 98 30 6445 dated Dec. 14, 1998.

*Primary Examiner*—Maria Nuzzolillo
*Assistant Examiner*—Tracy Dove
(74) *Attorney, Agent, or Firm*—Ratner & Prestia

(57) ABSTRACT

A manufacturing method for an expanded grid includes the steps of: (a) supplying a thin plate of band form from the longitudinal direction, (b) forming a plurality of intermittent cuts parallel to the edge in a first region, excluding the central portion, of the thin plate of band form, (c) bending the central portion at a desired angle, and (d) expanding and developing the cuts in the width direction, while moving sequentially in the longitudinal direction the thin plate having the first region forming the plurality of cuts and the central portion not having the cuts, in which the first track distance of the outermost side portion of the first region having the cuts developed and formed is nearly the same distance as the track distance of the central portion. The plane distortion of the grid is eliminated, the width dimension of the grid is stable, and the quality of the electrode plate using such grid is enhanced. Further, local stress concentration of the grid is suppressed.

5 Claims, 7 Drawing Sheets

| Step of supplying a thin plate of band form from the longitudinal direction |

| Step of forming a plurality of intermittent zigzag cuts parallel to the edge in a region excluding the central portion of the thin plate of band form |

| Step of bending the central portion not forming cuts at a desired angle |

| Step of expanding and developing the cuts in the width direction, while moving sequentially in the longitudinal direction the thin plate of band form having the region forming the cuts and the central portion not having the cuts (at this time, the track distance of the outermost side portion of the thin plate obtained by developing the cuts is nearly same as the track distance of the central portion) |

FIG. 2

MANUFACTURING METHOD OF EXPANDED GRID AND ITS MANUFACTURING APPARATUS

FIELD OF THE INVENTION

The present invention relates to a manufacturing method of expanded grid used in a storage battery, and a manufacturing apparatus of expanded grid.

BACKGROUND OF THE INVENTION

Generally, an expanded grid used as the core of an electrode of a storage battery is manufactured in a step of forming parallel intermittent cuts in the width direction in a surface of a region excluding the central portion of a thin plate in a band form made of metal such as lead or lead alloy continuously in a zigzag form, and a step of expanding and developing the thin plate having cuts in the width direction. The expanded grid used widely as the grid for electrode plates of a lead acid storage battery is superior to the casting grid in the mass producibility, and is suited to the lead acid storage batteries of mass-produced automobiles. Recently, a higher performance is demanded in the batteries, and it is required to reduce the mesh size of the grid in order to enhance the current collecting effect of the grid.

However, in such an expanded grid, the width is developed by extending the cuts sequentially. As a result, the track distance at the outermost side of the band metal plate is longer than the track distance in the central portion. Accordingly, creases are formed when developing the thin plate having cuts in a flat plane, and the creases cause deflection, which yield periodic creases in the developed grid. Due to such creases, the width dimension of the grid becomes unstable. As a result, adjusting the manufacturing condition becomes a labor-intensive task. Furthermore, the dimensional precision of the electrode plate is not stable, and the quality fluctuations are significant. In addition, a local distortion occurs in the grid which is likely to promote grid corrosion. Such phenomenon occurrs more prominently in the grid with the smaller mesh size.

SUMMARY OF THE INVENTION

A manufacturing method for an expanded grid of the invention includes:

(a) a step of supplying a thin plate of band form from the longitudinal direction, (b) a step of forming a plurality of intermittent cuts parallel to the edge in a first region, excluding a second region, of the thin plate of band form, and, (c) a step of expanding and developing the cuts in the width direction, while moving sequentially in the longitudinal direction the thin plate having the first region forming the plurality of cuts and the second region not having the cuts, in which the outermost side portion of the first region moves a first track distance when expanding the cuts, the second region moves a second track distance, and the first track distance and the second track distance are nearly the same distance.

Preferably, the manufacturing method further includes:

(d) a step of bending the second region at a desired angle, in which as the thin plate having the cuts and bent at the angle moves sequentially in the longitudinal direction, the cuts are expanded and developed in the width direction, so that the first track distance and the second track distance are nearly the same distance.

Preferably, the second region is a central portion of the thin plate of band form, the first region is both side portions of the central portion, and the central portion is bent at a position for terminating the expansion of the outermost side portion.

A manufacturing apparatus for an expanded grid of the invention includes:

(a) a processing means for forming a plurality of intermittent cuts parallel to the edge of a thin film of band form, in a first region, excluding a second region, of the thin plate of band form, (b) developing means for expanding and developing the cuts in the width direction, while moving sequentially in the longitudinal direction the thin plate having the first region forming the plurality of cuts and the second region not having the cuts, and setting means for setting a first track distance of outermost side portion of the first region moving when expanding the cut nearly at a same distance as second track distance of the second region.

Preferably, the setting means is a bending means for bending the second region at a predetermined angle.

Preferably, the second region is a central portion of the thin plate of a band form, the first region is both side portions of the central portion, and the central portion is bent at a position for terminating the expansion of the outermost side portion.

In this embodiment, the occurrence of creases due to plane distortion is prevented, and the width dimension of the grid is stabilized. These effects are enhanced. When manufacturing a grid with a smaller mesh size. The local stress concentration of the grid is alleviated. As a result, the quality of the electrode plate using such grid is enhanced. Hence, the battery using the grid of the invention presents an excellent life characteristic, and a stable performance having only small performance fluctuation width. Moreover, by using a grid with a smaller mesh size, the storage battery will achieve excellent charging and discharging characteristics.

BRIEF DESCRIPTION OF THE DRAWINGS

FIG. 2 is a process chart of a manufacturing method for an expanded grid in an embodiment of the invention.

REFERENCE NUMERALS

1 Processing blade (processing means)
2 Thin plate of band form

3 Bending means (setting means, bending machine)
4 Base
5 Track of outermost side portion of thin plate
6 Track of central portion of thin plate
7 Distortion

DETAILED DESCRIPTION OF THE INVENTION

Figure 1:
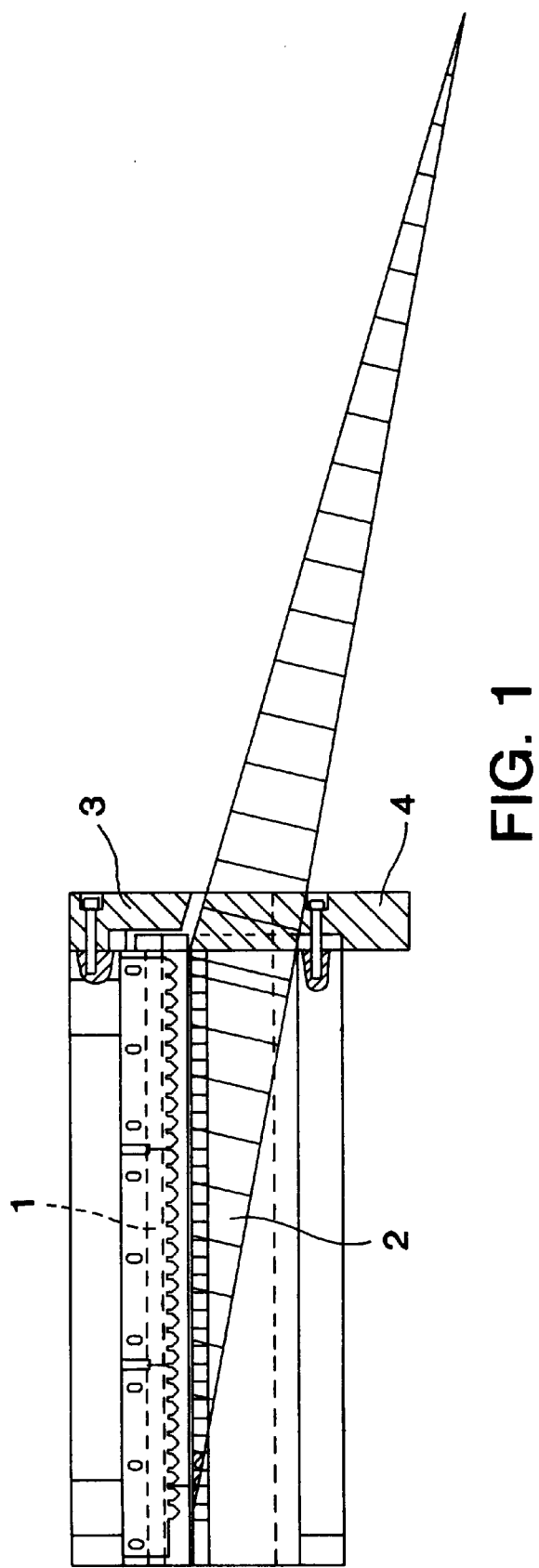
FIG. 1 is a side view of a manufacturing apparatus used in a manufacturing method for an expanded grid in an embodiment of the invention.

A side view of an apparatus used in a manufacturing method for an expanded grid is shown in FIG. 1. In FIG. 1, the manufacturing apparatus of the grid includes a processing blade 1, bending means 3, and a base 4 as the processing means. The processing blade 1 has about 30 blades. A thin plate film 2 of band form moves the lower side of the processing blade 1 in the longitudinal direction. The motions of the thin plate film 2 are synchronized with the processing blade 1 and the bending means 3. As the processing blade 1 moves reciprocally in the vertical direction, cuts are formed in the thin plate film 2 of band form in a mesh pattern. The thin plate film 2 of band form is composed of lead-tin-calcium alloy, and its thickness is about 1.0 mm. The thin plate film 2 containing mesh pattern cuts is expanded and developed in the width direction of the thin plate film 2. The bending means 3 has a hammer shape. It is disposed at the terminating position of expansion of the outermost side portion of the thin plate film 2. The bending means 3 works in conjunction with the thin plate film 2 to expand and develop cuts in the width direction. The bending means 3 bends only the central portion of the thin plate where cuts are not formed. The bending means 3 moves reciprocally in the vertical direction in sync with the processing blade 1. The base 4 is fixed so as to support the bending means 3 still at its position. When the thin plate film 2 is pushed and bent by the bending means 3, the base 4 plays a role of controlling its bending angle.

Figure 7:
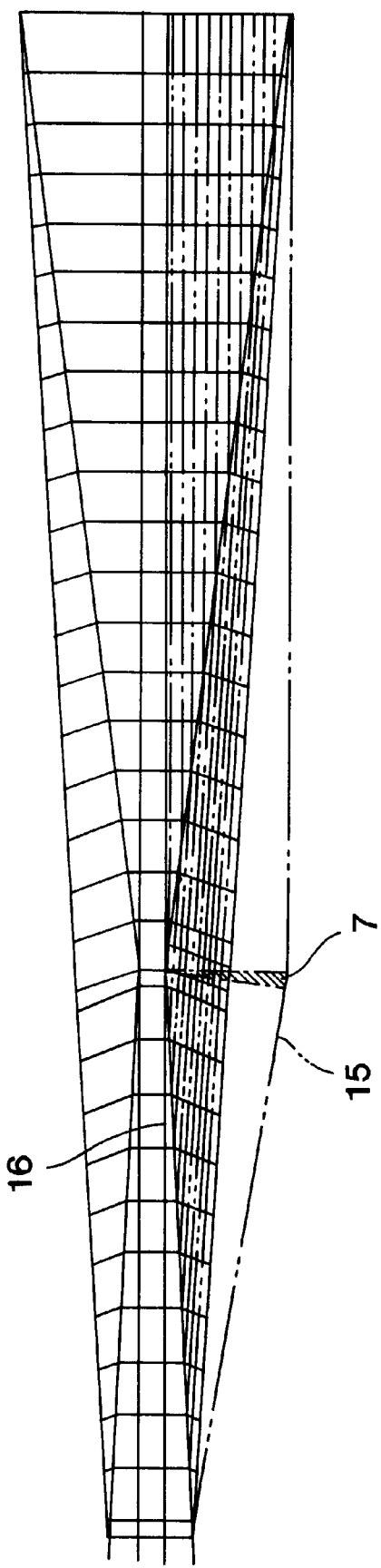
FIG. 7 is a position configuration diagram of plane development in a manufacturing method for an expanded grid in a prior art.

First, by way of comparison, a conventional manufacturing method of grid is described below. FIG. 7 shows the position configuration diagram of plane development of forming cuts in the thin plate film 2 of band form, and sequentially expanding and developing in the width direction. In FIG. 7, the outermost side portion of the thin plate film 2 is in band form The thin plate film 2 has cuts in a mesh pattern which advances a track 15, and the central portion advances a track Herein, the track distance of the outermost side portion from the point of starting expansion of the cuts in mesh pattern to the point of terminating the expansion is approximately 510 mm. The track distance of the central portion is approximately 495 mm. The rack distance of the outermost side portion is longer than the track distance of the central portion by about 15 mm, and a plane distortion 7 occurs as shown in the shaded area due to this different in the track distance. Due to such distortion, creases were formed in the expanded grid. Moreover, the skeleton of the grid was bent, and a local stress concentration occurred originating from the deflection of the skeleton.

FIG. 2 depicts the process chart of the manufacturing method of the grid in one embodiment of the invention. First, the thin plate film 2 of band form is placed at the lower side of the processing blade 1. The manufacturing apparatus of the grid shown in FIG. 1 features the processing blade 1, with the bending means 3, the thin plate film 2, and the base 4. The processing blade 1 is then moved up and down, and the central portion of the thin plate film 2 is bent at a desired angle. By setting the bending machine 3 in a desired shape, the thin plate can be bent three-dimensionally. In this embodiment, the deflection angle is about 17 degrees.

Figure 3:
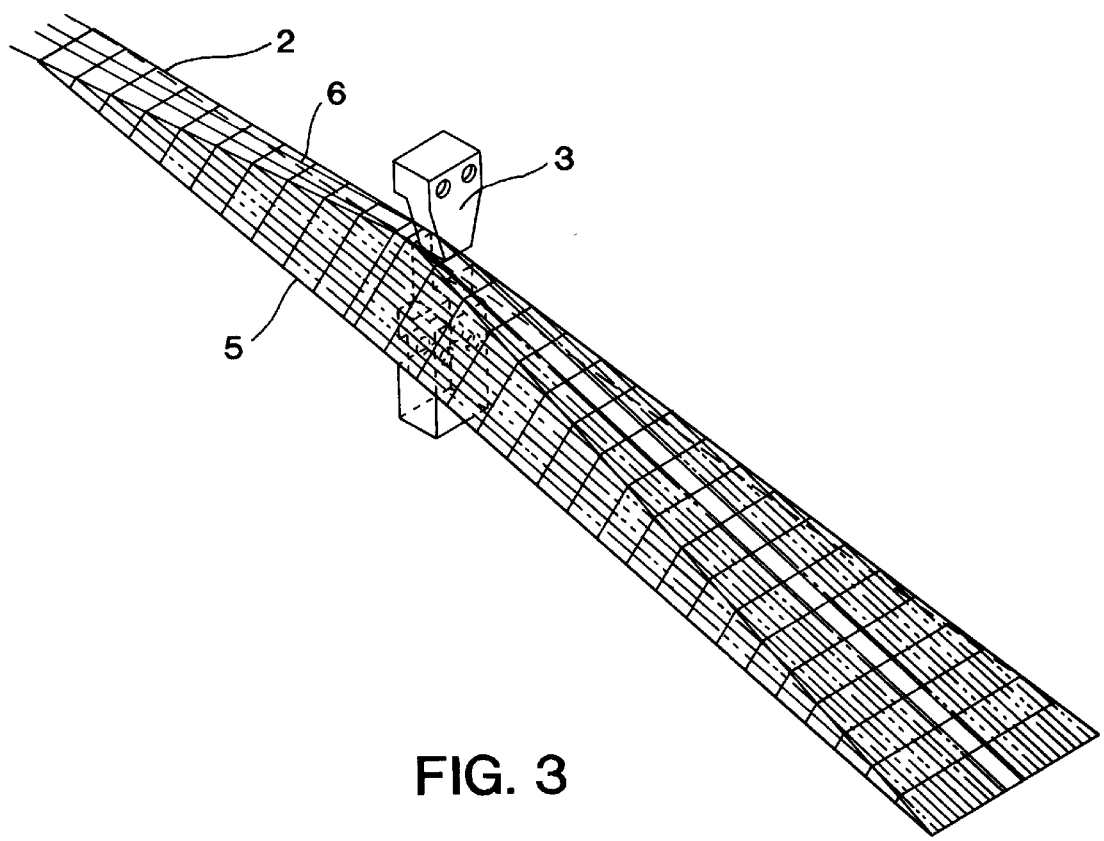
FIG. 3 is a position configuration diagram of solid development in a manufacturing method for an expanded grid in an embodiment of the invention.
Figure 4:
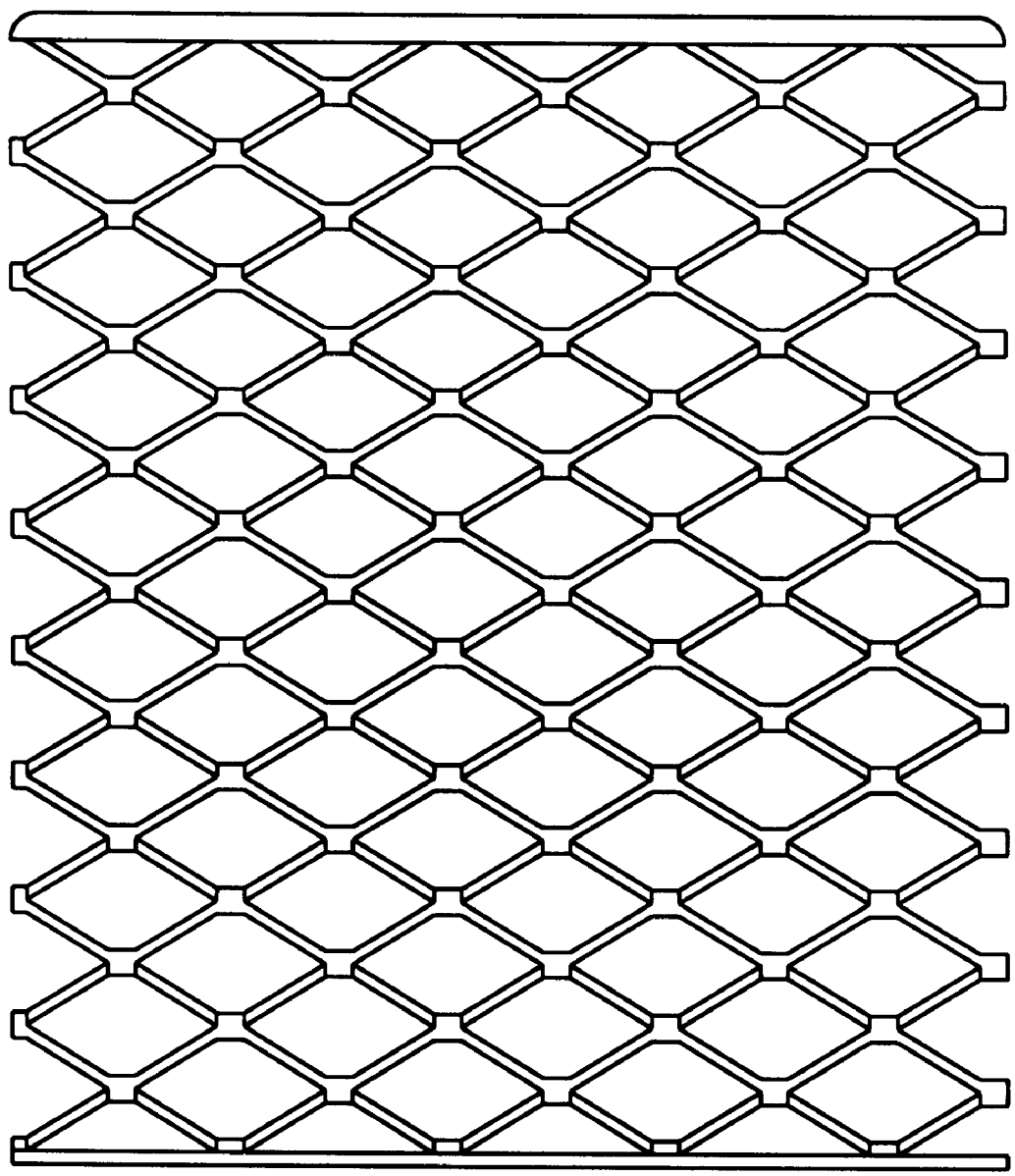
FIG. 4 is a plan view of an expanded grid manufactured by a manufacturing method for an expanded grid in an embodiment of the invention.

Consequently, as shown in FIG. 3, the thin plate film 2 has a cut region and the uncut region. It is sequentially moved in the longitudinal direction, and the cuts are expanded and developed in the width direction. At this time, the thin plate film 2 is designed to expand three-dimensionally. When expanding the cuts sequentially with the central portion in bent state, the track distance 5 of the outermost side portion of the thin plate film 2 of band form is shorter than in the case not having bent state. That is, the track distance 5 of the outermost side portion of the thin plate film 2 of band form is nearly same distance as the track distance 6 of the central portion. By this method, the plane distortion 7 shown in shaded area in FIG. 7 is prevented. By controlling the deflection angle of the bending machine 3 appropriately depending on the difference of the track distance, the track distance 5 of the outermost side portion of the thin plate film 2 of the band form is nearly the same as the track distance 6 of the central portion. Then the folded portion and central portion of the newly developed thin plate film 2 are cut off. A plan view of the newly developed expanded grid is shown in FIG. 4.

Figure 5:
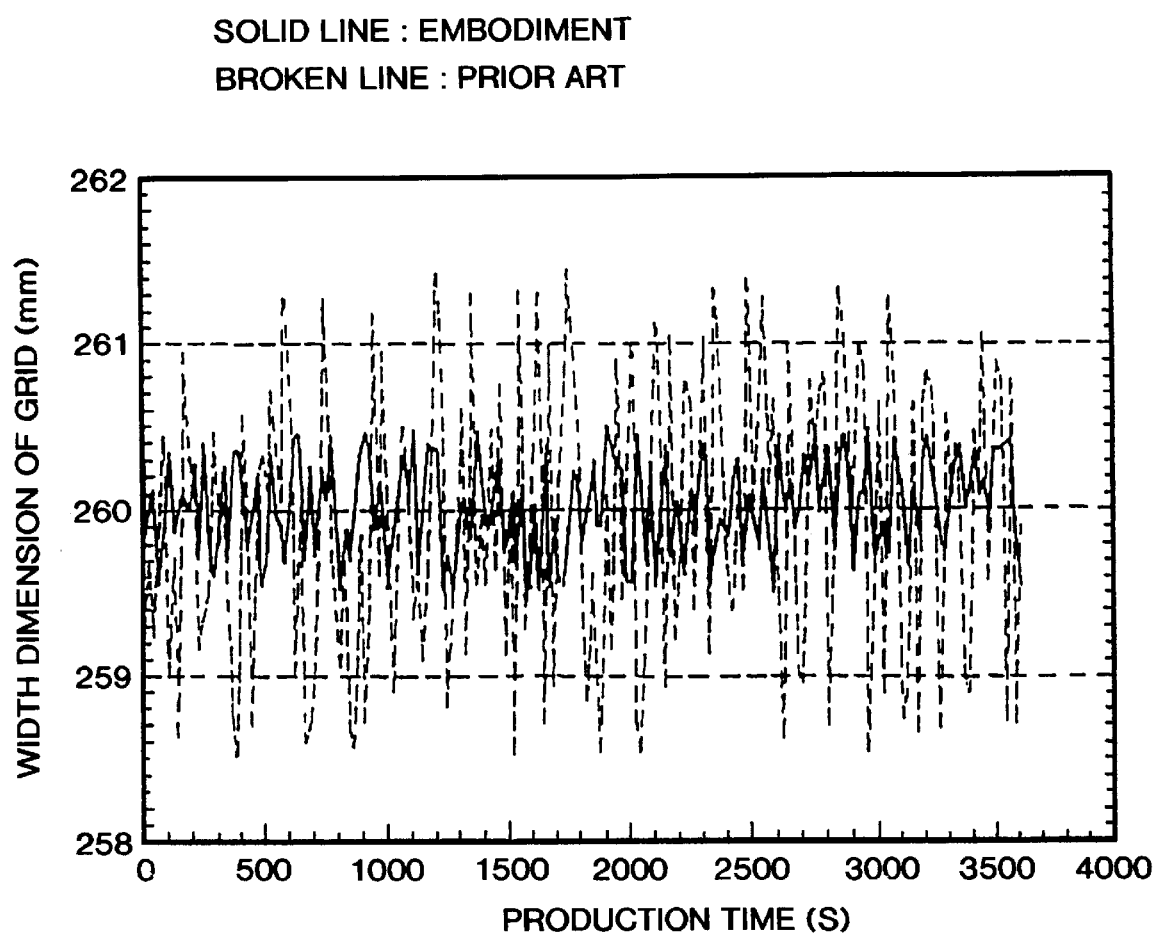
FIG. 5 is a graph showing the relation between production time and the width dimension of the expanded grid.

The relation between the production time and width dimension changes of the grid during production of expanded grid is shown in FIG. 5. In FIG. 5, the solid line refers to this embodiment, and the broken line shows a prior art. Fluctuations of the width dimension of the solid line showing the present embodiment are about ⅓ of fluctuations of the broken line showing the prior art. That is, the grid formed in this embodiment is stable in the width dimension. Moreover, fluctuations in the cutting dimensions during the process of cutting off the thin plate can also be decreased. Furthermore, the manufacturing conditions and the process of filling with the paste containing active material can be also controlled easily.

In the conventional method, the skeleton of the grid was bent by a plane distortion 7, as indicated by the shaded area in FIG. 7. A local stress concentration was initiated from the deflection of this skeleton, but occurrence of such local stress concentration was decreased in the invention.

Figure 6:
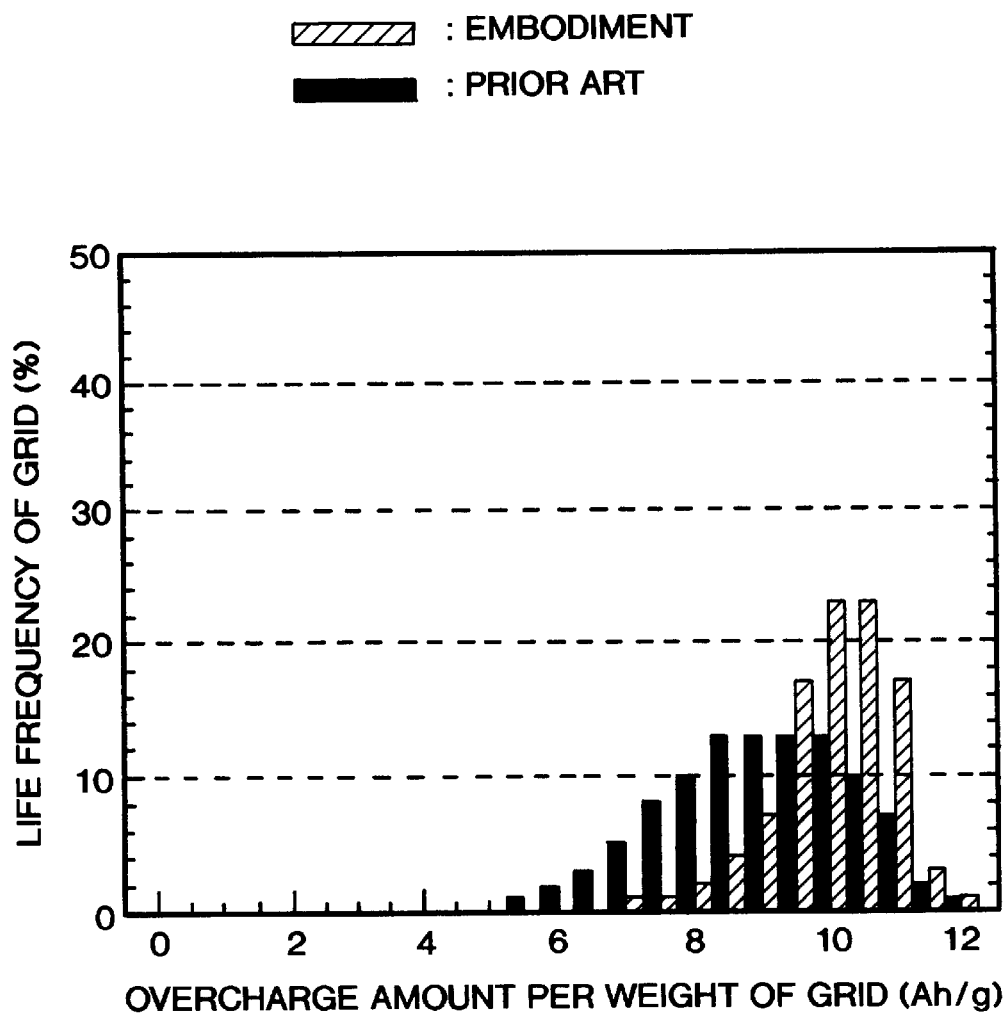
FIG. 6 is a graph comparing the relationship between the overcharge amount and the life frequency of the storage battery using the expanded grids of the present invention and a prior art.

Next, the grid was presented for corrosion test. Using the grid of the embodiment and the grid of the prior art, various storage batteries were prepared, and the life frequency of the storage batteries was measured. Active materials were adhered to the grids to prepare electrode plates. Various storage batteries were manufactured by using the electrode plates and electrolyte. In these storage batteries, the relation between the overcharge amount (Ah/g) pet weight of grid and the life frequency (%) of storage battery is shown in FIG. 6. That is, FIG. 6 shows the frequency distribution of overcharge amount per weight of grid at the end of grid life. The overcharge amount per weight of the grid is (charge amount per charge)×(number of cycles)/(grid weight). The life of the grid was determined when the discharge capacity becomes 80% of the initial capacity.

In FIG. 6, in the conventional grids, the battery life began to be found from the overcharge amount of about 5 Ah/g, and the life was over in certain batteries even when the overcharge amount was small. The distribution width (variance) of the overcharge amount was in a range of about 5 Ah/g to about 12 Ah/g, and the distribution width of the overcharge amount was large. The short life of a battery at small overcharge amount was mainly caused by corrosion at the crease location of the grid.

By contrast, in the batteries using the grid of the embodiment, the battery life began to be found from the overcharge amount of about 7 Ah/g, and the life was over in some batteries at a larger overcharge amount than in the batteries using the conventional grids. Further, the distribution width (variance) of the overcharge amount was in a range of about 7 Ah/g to about 12 Ah/g, and the distribution width of the overcharge amount was small. In the batteries using the grid of the invention, the life was extremely improved as compared with the batteries using the conventional grids. The batteries using the grids of the invention have a stable charge performance.

In the manufacturing method of the expanded grid in the embodiment, cuts were formed by vertical reciprocating motion, but are not limited this method. The same effect is obtained in a manufacturing method of expanded grid by forming cuts by means of a rotating element. In the invention, the thin plate of band form is not particularly limited, but lead or lead alloy can be used, and a particularly excellent lead acid storage battery is obtained is such a case.

Thus, according to this invention, the plane distortion of the grid is eliminated, the width dimension of the grid is stable, and the quality of the electrode plate using such grid is enhanced. Further, local stress concentration of the grid is suppressed. These benefits are enhanced when manufacturing the grid having fine mesh pattern. As a result, the battery using the grid of this invention has an excellent life characteristic, small performance fluctuation width, and a stable performance. By using the grid with a fine mesh pattern, a storage battery will have excellent charging and discharging characteristics.

What is claimed is:

1. A manufacturing method for an expanded grid comprising the steps of:

(a) supplying a plate from a longitudinal direction, (b) forming a plurality of intermittent cuts parallel to an edge in a first region, excluding a second region, of said plate and (c) expanding and developing said cuts in a width direction, while moving sequentially in said longitudinal direction said plate having said first region forming said plurality of cuts and said second region not having said cuts, wherein an outermost side portion of said first region moves a first track distance when expanding said cuts, said second region moves a second track distance, and said first track distance and said second track distance are substantially equivalent.

2. A manufacturing method for an expanded grid of claim 1, further comprising:

(d) a step of bending said second region at an angle, wherein as said plate having said cuts and bent at said angle moves sequentially in said longitudinal direction, said cuts are expanded and developed in said width direction, so that said first track distance and said second track distance are substantially equal.

3. A manufacturing method for an expanded grid of claim 1, further comprising:

(e) a step of bending said second region at an angle, wherein said second region is a central portion of said plate, said first region is both side portions of said central portion, and said central portion is bent at a position for terminating the expansion of said outermost side portion, wherein as said plate having said cuts and bent at said angle moves sequentially in said longitudinal direction, said cuts are expanded and developed in said width direction, so that said first track distance and said second track distance are substantially equal.

4. A manufacturing method for an expanded grid of claim 1, further comprising:

(d) a step of bending said second region at an angle, wherein said second region is a central portion of said plate, said first region is both side portions of said central portion, and said central portion is bent at a position for terminating the expansion of said outermost side portion so as to be guided by a bending means, wherein as said plate having said cuts and bent at said angle moves sequentially in said longitudinal direction, said cuts are expanded and developed in said width direction, so that said first track distance and said second track distance are substantially equal.

5. A manufacturing method of for an expanded grid of claim 1, wherein said plate is composed of at least one conductive substance of lead and lead alloy, and is used as a core of an electrode of a lead acid storage battery.

* * * * *

UNITED STATES PATENT AND TRADEMARK OFFICE
CERTIFICATE OF CORRECTION

PATENT NO.    : 6,243,932 B1
DATED         : June 12, 2001
INVENTOR(S)   : Kashio et al.

It is certified that error appears in the above-identified patent and that said Letters Patent is hereby corrected as shown below:

Column 5,
Line 4, "equivalent" should read -- equal --.

Signed and Sealed this

Third Day of December, 2002

JAMES E. ROGAN
*Director of the United States Patent and Trademark Office*